US009862569B2

(12) United States Patent
Vlasov

(10) Patent No.: US 9,862,569 B2
(45) Date of Patent: Jan. 9, 2018

(54) BRAKE AND AN ELEVATOR

(71) Applicant: Timo Vlasov, Lahti (FI)

(72) Inventor: Timo Vlasov, Lahti (FI)

(73) Assignee: KONE CORPORATION, Helsinki (FI)

( * ) Notice: Subject to any disclaimer, the term of this patent is extended or adjusted under 35 U.S.C. 154(b) by 443 days.

(21) Appl. No.: 14/219,723

(22) Filed: Mar. 19, 2014

(65) Prior Publication Data
US 2014/0291075 A1 Oct. 2, 2014

(30) Foreign Application Priority Data

Apr. 2, 2013 (EP) ..................................... 13161935

(51) Int. Cl.
| B66B 5/00 | (2006.01) |
| F16D 49/00 | (2006.01) |
| B66D 5/08 | (2006.01) |
| F16D 121/16 | (2012.01) |
| F16D 121/22 | (2012.01) |
| F16D 125/36 | (2012.01) |
| F16D 121/14 | (2012.01) |

(52) U.S. Cl.
CPC .............. B66B 5/00 (2013.01); B66D 5/08 (2013.01); F16D 49/00 (2013.01); F16D 2121/14 (2013.01); F16D 2121/16 (2013.01); F16D 2121/22 (2013.01); F16D 2125/36 (2013.01)

(58) Field of Classification Search
CPC ............................. B66B 5/00; F16D 2121/16
See application file for complete search history.

(56) References Cited

U.S. PATENT DOCUMENTS

| 4,476,965 A | * | 10/1984 | Brown, Jr. .............. F16D 55/36 188/171 |
| 4,860,605 A | | 8/1989 | Olschewski et al. |
| 5,685,398 A | * | 11/1997 | Marshall ................. F16D 55/28 164/108 |

(Continued)

FOREIGN PATENT DOCUMENTS

| EP | 0997660 A2 | 5/2000 |
| FR | 2614082 A1 | 10/1988 |

OTHER PUBLICATIONS

European Search Report for EP13161935 dated Nov. 5, 2013.

*Primary Examiner* — William E Dondero
*Assistant Examiner* — Diem Tran
(74) *Attorney, Agent, or Firm* — Harness, Dickey & Pierce, PLC

(57) ABSTRACT

A brake comprising a frame, a braking member mounted on the frame movably between braking position and released position, and a rotatable lever mounted on the frame, the lever being functionally connected to the braking member such that movement of the lever axially away from frame moves the braking member towards released position. At least one cylindrical roller is mounted on one of the brake frame and lever, to be positioned between the brake frame and the lever, and the other of the brake frame and lever comprises a recess for receiving said cylindrical roller, and in that rotation of the lever is configured to cause said cylindrical roller to roll outwards from the recess along an edge portion of the recess forcing the lever to move axially away from the frame, thereby causing the braking member to move towards released position.

14 Claims, 3 Drawing Sheets

(56) References Cited

U.S. PATENT DOCUMENTS

| | | | | |
|---|---|---|---|---|
| 6,082,504 A * | 7/2000 | Organek | ............... | F16D 55/00 |
| | | | | 188/71.2 |
| 6,173,820 B1 * | 1/2001 | Blosch | ................ | F16D 65/18 |
| | | | | 188/158 |
| 6,374,958 B1 * | 4/2002 | Usui | ................. | B60T 13/741 |
| | | | | 188/156 |
| 6,631,789 B1 * | 10/2003 | de Jong | ................ | B66B 5/00 |
| | | | | 187/287 |
| 2002/0079172 A1 | 6/2002 | Shaw et al. | | |

\* cited by examiner

BRAKE AND AN ELEVATOR

This application claims priority to European Patent Application No. EP13161935 which has a filing date of Apr. 2, 2013, the entire contents of which are incorporated herein by reference.

FIELD OF THE INVENTION

The invention relates to a mechanism for releasing a brake, in particular to a mechanism for releasing of a brake of an elevator.

BACKGROUND OF THE INVENTION

In elevators, a brake is used for stopping movement of the elevator car and for holding elevator car immovable after it has stopped. The brake is movable between braking position and released position. In the braking position a braking member, such as a friction piece, of the brake is pressed into contact with a surface of the movable component the movement of which is being braked. In the released position, the braking member is not in contact with said movable component. In elevators, it is typical that said movable component is the drive sheave around which the hoisting ropes of the elevator pass. In that case, the brake is mounted stationary on the frame of the drive machine comprising said drive sheave. The brakes are generally of the fail-safe type, where a compression spring or an equivalent means constantly urges the braking member towards braking position. The brake control is carried out by controlling a brake releasing means, such as a electromagnet-type actuator, which when activated works against said urging with a counter force thereby being able to release the brake. For this purpose, the brake system comprises an automatic brake control, which controls the state of the brake by controlling the force of the brake releasing means. In addition to this automatic brake control, the system sometimes needs to be provided with an auxiliary means for releasing the brake. In most countries, an elevator needs to have a manually operable auxiliary means for releasing the brake. In this way, the elevator car can be released in case of a power failure to move under gravity and thereby brought level with a landing. Thereby safe passenger evacuation is enabled independently of power supply. There are also other reasons for occasional manual releasing of the brake. For example, the brake may also need to be released during servicing of the system without using electricity. In known systems, said manually operable releasing means typically comprise a handle which is functionally connected to the brake member such that movement of handle works against the force of the aforementioned spring that urges the brake towards braking position. Actuation of the handle moves the braking member towards released position. The handle may be connected to the braking member mechanically in various ways. A challenge is that the force of said urging means is so strong that some sort of leverage is necessary to make it possible that said force can be overcome by manually produced counter force. A problem with the known solutions is that the existing lever mechanisms are not simple, compact and easily movable. In elevators, it is always important that the brake does not consume too much space. Space-efficiency is important especially in cases where the drive machine (i.e. the drive sheave and the brake) is installed inside the elevator hoistway. In known solutions a problem has been to provide a simple lever mechanism which has adequate movability. In particular, the resistance produced by the lever mechanism should be small to make manual actuation possible. Also, it has been a problem to provide a mechanism where this movability is maintained good for a long time. Taking into account the above presented, it has come up a need for an improved solution for releasing a brake manually.

BRIEF DESCRIPTION OF THE INVENTION

The object of the invention is, inter alia, to solve previously described drawbacks of known solutions and problems discussed later in the description of the invention. An object of the invention is to introduce a brake and an elevator with improved brake releasing. Embodiments are presented, inter alia, where the mechanism for brake releasing is manually operable. Embodiments are presented, inter alia, where the mechanism for brake releasing has long service life and good movability.

It is brought forward a new brake comprising a frame, a braking member mounted on the frame movably between braking position and released position, and a rotatable lever mounted on the frame, the lever being functionally connected to the braking member such that movement of the lever axially away from frame moves the braking member towards released position. At least one cylindrical roller is mounted on one of the brake frame and lever, to be positioned between the brake frame and the lever, and the other of the brake frame and lever comprises a recess for receiving said cylindrical roller, and rotation of the lever is configured to cause said cylindrical roller to roll outwards from the recess along an edge portion of the recess forcing the lever to move axially away from the frame, thereby causing the braking member to move towards released position. In this way, one or more of the previously described drawbacks can be avoided. In particular, the rotation of the lever can be transformed effectively into axial movement of the lever and thereby into movement of the braking member towards released position. The cylindrical rollers ensure good movability between the lever and frame, which is maintained for a long time despite the great forces affecting the mechanism. The lever provided with this structure can also be rotated along the frame thereby facilitating compactness of the overall structure. Good movability ensures safety of the system comprising the brake, as it is crucial that the components move well, even if they have been unused for a long period of time. Especially, for manual operation, good movability is important. Also, due to its vast contact area, the cylindrical roller can bear a high load without damaging neither the frame nor the lever. In particular, the lever material need not be made extremely hard and therefore it can be manufactured cheaply.

In a preferred embodiment, said cylindrical roller has a rotational axis aligned radial to the rotational axis of the lever.

In a preferred embodiment, the brake comprises a means for urging the braking member towards braking position. Thus, a means for actuating the brake are provided. Thus, the lever can be used only for the purpose of releasing the brake.

In a preferred embodiment, said cylindrical roller is mounted unfixedly in a bearing housing formed in the frame. Thus, a very simple bearing structure is achieved.

In a preferred embodiment, movement of the lever axially away from frame moves the braking member towards released position working against the urging means. In this way, the system is fail-safe, because the brakes are released only by a specific releasing act.

In a preferred embodiment, each of said at least one cylindrical roller is elongated in its axial direction. Thus, a vast contact area is provided. Thereby, contact forces are reduced. Thereby service life and the aforementioned movability can be increased, as well as the material requirements eased.

In a preferred embodiment, the recess is a groove. Preferably, a flank of the groove forms said edge portion along which the cylindrical roller rolls outwards from the recess. Preferably, the recess is a V-groove.

In a preferred embodiment, the recess is a groove aligned radial to said rotational axis of the lever. This facilitates good rolling behavior as well as self positioning of the roller to have a rotational axis aligned radial to the rotational axis of the lever. The groove is preferably elongated its longitudinal direction aligned radial to said rotational axis of the lever. Thereby, it can receive an elongated cylindrical roller and a long linear contact area can be provided between the cylindrical roller and the recess. The flanks of the elongated groove-like recess are thereby also close to each other such that the roller can not wander in the recess excessively.

In a preferred embodiment, the edge portion along which the roller rolls comprises a surface portion which is at an acute angle relative to the plane or rotation of the lever. Thus, wedging of the roller between the lever and the frame is facilitated.

In a preferred embodiment, the edge portion along which the roller rolls comprises a planar surface portion which is at an angle relative to the plane or rotation of the lever. Preferably, the angle of the planar surface portion is between 15 and 30 degrees. Thereby, best wedging effect is achieved with reasonable force needed for the rotation of the lever.

In a preferred embodiment, it comprises a manually operable handle functionally connected to the lever such that manual operation of the handle causes said rotation of the lever.

In a preferred embodiment, the cylindrical roller has a linear contact area with the recess. Thereby, contact forces are reduced. Thereby service life and the aforementioned movability can be increased, as well as the material requirements eased.

In a preferred embodiment, each roller is mounted in a bearing housing, such as a nest, the roller extending out from the bearing housing (nest) and partly inside the recess.

In a preferred embodiment, a plurality of cylindrical rollers are mounted on said one of the brake frame and lever, and the other of the brake frame and lever comprises a plurality of recesses for receiving the cylindrical rollers, and in that rotation of the lever is configured to cause each cylindrical roller to roll outwards from the corresponding recess along an edge portion of the recess forcing the lever to move axially away from the frame thereby causing the braking member to move towards released position. Each of these plural rollers and corresponding recesses are preferably as defined earlier above. Plural rollers and corresponding recesses strengthen the earlier mentioned benefits. The forces are more evenly distributed on plural rollers and the lever is not prone to tilting during rotation thereof.

In a preferred embodiment, the lever is mechanically connected to the braking member. Preferably, the lever is mechanically connected to the braking member with a bolt or an equivalent such that the axial movement of the lever is transmitted to the bolt or equivalent and further from the bolt or equivalent to the braking member. The bolt or equivalent is preferably aligned to extend along the rotational axis of the lever. Thereby, the bolt or equivalent preferably forms the shaft around which the lever turns. The axial movement of the lever causes the bolt or equivalent to move away from frame in the same direction, i.e. in the direction of the rotational axis of the lever, pulling the braking member in this same direction away from contact with the component the movement of which is affected with the brake and thereby towards released position.

It is also brought forward a new elevator comprising and elevator car and a brake for stopping the elevator car and/or holding the elevator car in stopped state, the brake being arranged to affect via a braking member a movable component of the elevator that is connection with the elevator car in force transmitting manner. The brake is as defined above or elsewhere in the application such as in any one of the claims. Thus, an elevator is achieved which has a brake system that is easy and safe to use manually. Also, other benefits are obtained as above presented.

The elevator is preferably of the type where the car is arranged to serve two or more landings. Then, the car preferably responds to calls from landing and/or destination commands from inside the car so as to serve persons on the landing(s) and/or inside the elevator car. Preferably, the car has an interior space suitable for receiving a passenger or passengers. The car may be provided with a floor, a ceiling, walls and at least one door these all forming together a closable and openable interior space. In this way, it is well suitable for safely serving passengers.

BRIEF DESCRIPTION OF THE DRAWINGS

In the following, the present invention will be described in more detail by way of example and with reference to the attached drawings, in which.

DETAILED DESCRIPTION

A brake according to the preferred embodiment illustrated in FIGS. 1-5 comprises a frame 1, and a braking member 2 mounted on the frame 1 movably between braking position I and released position II. In the braking position I the braking member 2 is in contact with the component 13 the movement of which is being braked. In the released position II, the braking member 2 is not in contact with said movable component. The braking member 2 may be in the form of a friction pad, for instance.

Figure 5:
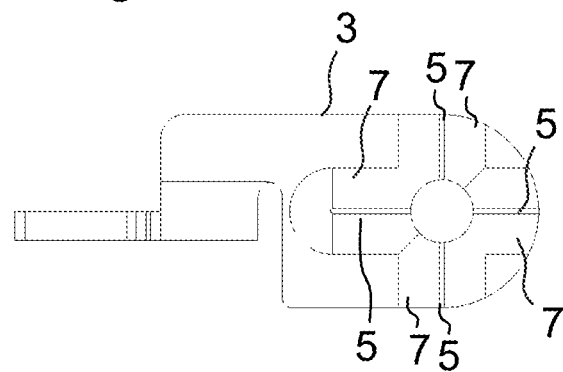
FIG. 5 illustrates the lever in its axial direction.

The brake further comprises a means 14 for constantly urging the braking member 2 towards braking position I. These means comprise preferably a spring or springs 14, as schematically illustrated in FIG. 5. The spring(s) 14 are arranged to affect between the frame 1 and the mounting base 15 of the braking member 2, and configured to urge the mounting base 15 together with the braking member 2 mounted thereon towards braking position II taking the reaction force from the frame 1. For the purpose of automatic brake control, the brake comprises a means 8 for releasing the brake, which are controllable by an electronic control system. The brake in this case being a brake of an elevator, the means 8 are controllable by an electronic control system of the elevator. These means 8 preferably comprise an electromagnet fitted to work against the means 14 that urge the braking member 2 towards braking position I.

The brake further comprises auxiliary means for releasing the brake. These means comprise a rotatable lever 3 mounted on the frame 1. The lever 3 is functionally connected to the braking member 2 such that movement of the lever 3 axially, i.e. in direction of its rotational axis relative to the brake frame 1, away from frame 1 moves the braking member 2 towards released position II working against aforementioned urging means 14. The rotatable lever 3 mounted on the frame 1 to rest against the frame 1 via rollers 6. The rollers 6 are provided for the purpose of facilitating movability (easy rotation) of the lever 3 relative to the frame 1 when the lever 3 is being rotated and also for the purpose of facilitating said axial movement for moving the lever 3. The force of the urging means 14 needs to be strong so as to achieve adequate braking effect in any case. Therefore, the force produced by the lever 3 needs to also to be strong, which sets challenges for the mechanism producing said axial movement of the lever. In the preferred embodiment, the rollers 6 are cylindrical. Thus, the contact area between the frame 1 and the rollers, as well as the contact area between the lever 3 and the rollers 6 is vast. They can bear a high load without damaging the frame 1 nor the lever 3. Thereby, the mechanism will maintain its usability for a long time. The rollers 6 are used for producing said axial movement of the lever 3, which movement is mechanically transmitted to the braking member 2. This axial movement is produced with wedging effect. The cylindrical rollers 6 are mounted on the brake frame 1, to be positioned between the brake frame 1 and the lever 3. For this purpose a support face comprised in the frame 1 comprises a nest 9 (per each roller 6) wherein the roller 6 is mounted. The lever 3 comprises a support face (in Figures the lower face) with a recess 5 (per each roller 6) for (partly) receiving said cylindrical roller 6 when the lever 3 and the frame 1 are against each other. For this purpose, the cylindrical rollers 6, also referred to as rollers in this application, extend out from their nests 9 and partly inside the recesses 5. Rotation of the lever 3 causes relative movement between the recess 5 and the roller 6 and thereby makes said cylindrical roller 6 to move outwards from the recess 5 rolling along an edge portion 7 of the recess 5 forcing the lever 3 to move axially away from the frame 1 thereby causing the braking member 2 to move towards released position II.

Figure 6:
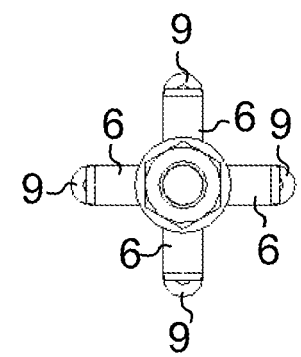
FIG. 6 illustrates the rollers mounted on the frame in axial direction of the lever.
Figure 7:
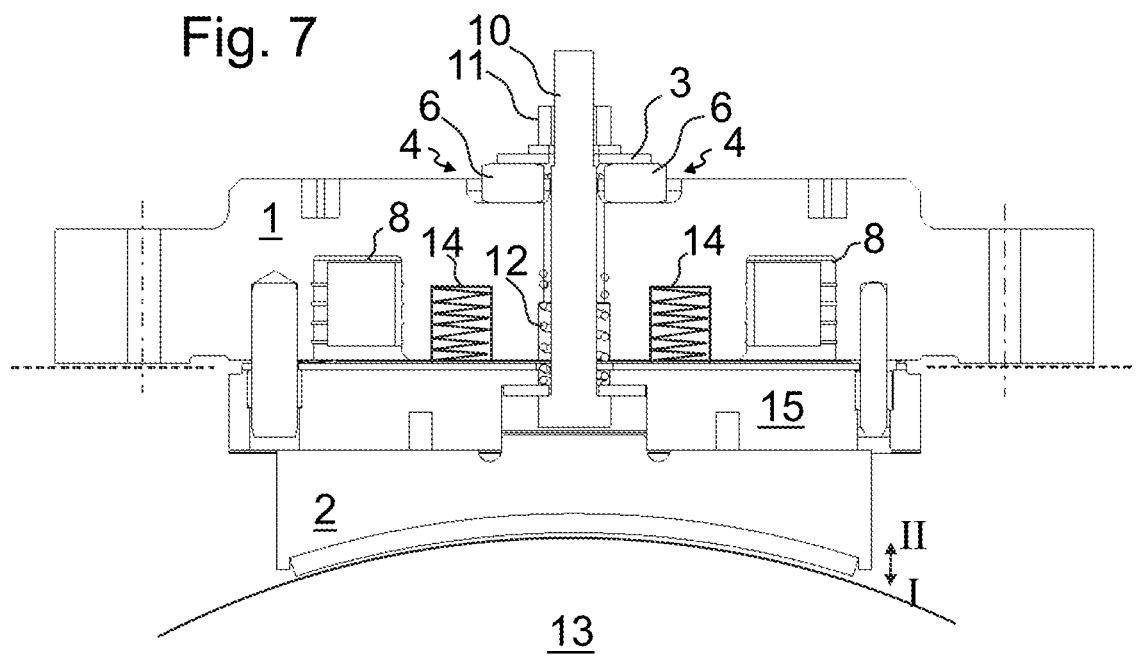
FIG. 7 illustrates a cross-section of the brake and the component being braked.

FIGS. 5 and 6 illustrate in details a preferred configuration of the recesses 5 and the rollers 6. Said cylindrical rollers 6 have each a rotational axis aligned radial to said rotational axis of the lever 3. Each of the cylindrical rollers 6 is elongated in its axial direction. Each recess 5 is a groove formed in the lever 3 and aligned radial to said rotational axis of the lever 3. The cylindrical roller 6 has a linear contact area with a flank of the recess 5. Thereby, the contact forces, namely the normal forces between the rollers 6 and the recess edge portions are low and a long service life can be ensured. A flank of the groove forms said edge portion 7 along which the cylindrical roller 6 rolls outwards from the recess 5. Each recess 5 is a V-groove formed in the lever 3.

Figure 4:
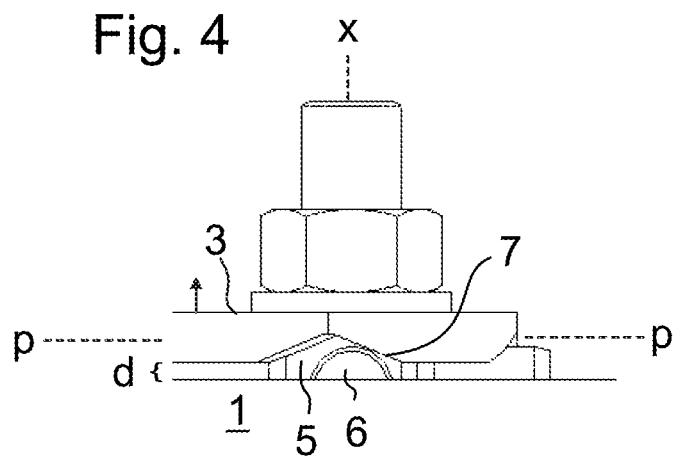
FIG. 4 illustrates a side view of the embodiment of FIG. 2.

It is particularly preferable that the edge portion 7 along which the roller 6 rolls comprises a planar surface portion which is at an acute angle relative to the plane or rotation p of the lever 3. The plane of rotation p as well as the rotational axis x of the lever 3 are illustrated in FIG. 4. The planar portion enables the opening force, which is produced by rotating the lever, to be maintained at least substantially constant. This facilitates keeping the normal forces between the roller bearing and the edge portion 7 of the lever 3 at a level which does not cause damages to the components. Also, manual force needed for actuation is thereby kept reasonable, because there are no peaks in the resistance during rotation of the lever. The angle is preferably between 15 and 30 degrees. Thereby, best wedging effect is achieved with reasonable force needed for the rotation of the lever 3. The planar form of the edge portion 7 is preferable but not necessary. The edge portion 7 could alternatively be curved.

Figure 1:
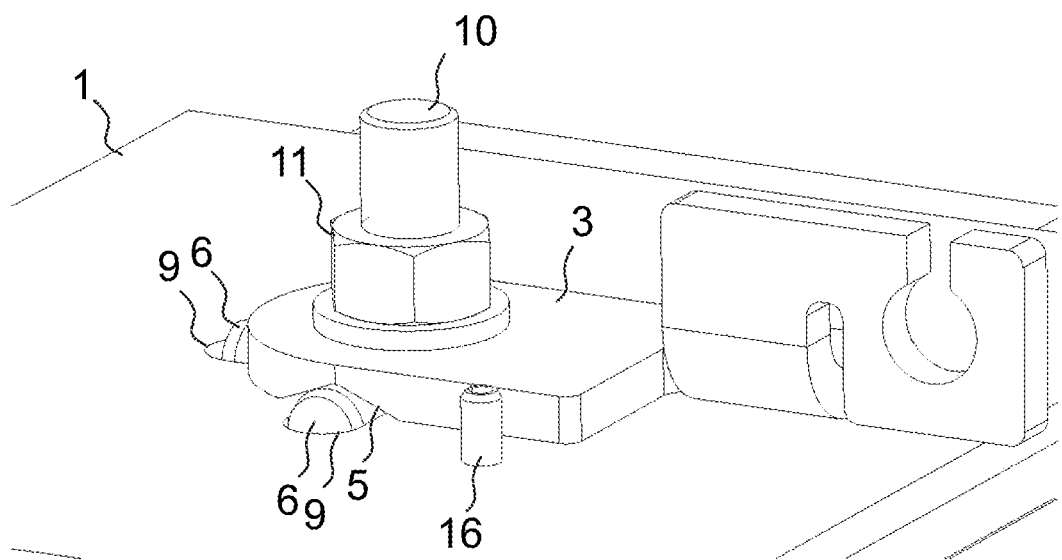
FIG. 1 illustrates an axonometric projection of a preferred embodiment of the brake in a situation where the lever is not rotated.
Figure 2:
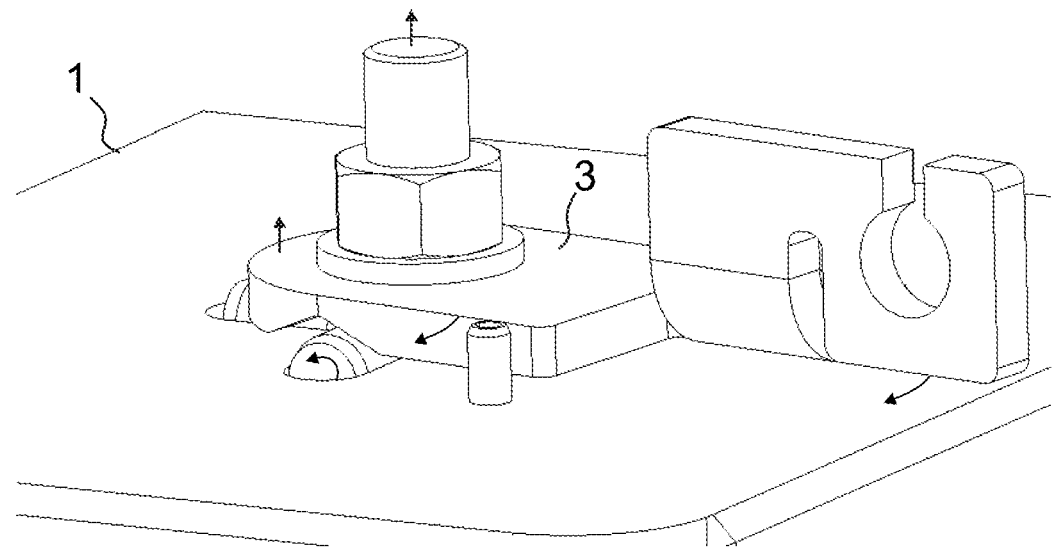
FIG. 2 illustrates an axonometric projection of a preferred embodiment of the brake in a situation where the lever is being rotated.
Figure 3:
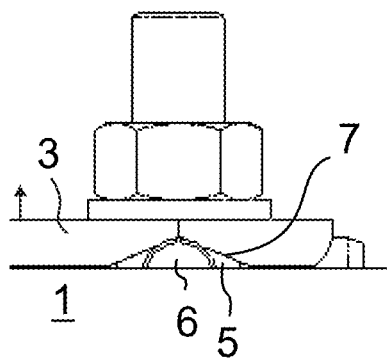
FIG. 3 illustrates a side view of the embodiment of FIG. 1.

FIGS. 1 and 3 illustrate the releasing mechanism of the brake when the lever 3 is not rotated. The lever 3 rests against the frame 1, preferably via the rollers 6. This is preferable so rattling can be avoided, but this is not necessary as the unrecessed portions of the lever 3 could rest directly on the frame 1 and the lever 3 would rest on the rollers 6 only after rotation of the lever 3. The mechanism can be adjusted to work either way by adjusting clearances suitably. A spring 12, as illustrated in FIG. 5, is arranged to constantly pull the lever 3 towards the rollers 6 and the frame 1 to keep them from rattling when brakes are kept in released position by means 8. When the lever 3 is rotated, as illustrated in FIGS. 2 and 4, the lever 3 is forced to move axially by the rollers 6 between the frame 1 and the lever 3. The rollers 6 roll along the edge portion 7 outwards from the recess 5 along an edge portion 7 of the recess 5 forcing the lever 3 to move axially away from the frame. Accordingly, the roller 6 wedges the lever 3 and frame 1 apart when the lever 3 is rotated. To achieve good wedging effect, the edge portion 7 along which the roller 6 rolls comprises a surface portion which is at an acute angle relative to the plane or rotation p of the lever 3. As illustrated in FIG. 4, the rotation of the lever 3 has moved the lever 3 a distance d apart from frame 1.

As above mentioned, the lever 3 is mechanically connected to the braking member 2. In the preferred embodiment, the lever 3 is connected to the braking member 2 with a bolt 10 resting against the mounting base 15 under the force of the spring 12. A nut 11 in the end of the bolt transmits axial movement of the lever 3 to the bolt 10, which transmits the movement to the mounting base 15. When the braking member 2 is released with means 8 the mounting base can move upwards in FIG. 5, which does not need to cause movement on the bolt 10 as it can move downwards in the FIG. 5 relative to the mounting base but if the lever 3 is rotated, the bolt moves upwards and the rim of the bolt 10 pulls the mounting base also upwards.

The cylindrical roller 6 is preferably mounted unfixedly in the nest 9 formed in the frame 1 and forming a bearing housing for the roller 6. In this way, the roller can very slightly tilt and adapt its position to match accurately the surface of the edge portion 7 during the rotation of the lever 3. This is also a very simple structure as the nest 9 can be a simple recess in the frame surface. Alternatively, the cylindrical roller 6 is mounted in the nest 9 formed in the frame 1 to roll supported on a shaft or equivalent the nest 9 also in this case forming a bearing housing for the roller 6. This regulates the roller 9 to roll in a strictly controlled manner and with low resistance. The surface of the edge portion 7 can in use slightly reform under pressure to accurately match the path that the roller 6 has during the rotation of the lever 3.

In the preferred embodiment, there are plurality of aforementioned recesses 5 and rollers 6 extending partly into them. Each recess is discontinuous in circumferential direction and therefore has an edge portion along which a roller can roll. In particular, there are four rollers 6 equidistantly distributed around the axis x. There are four recesses 5 are distributed in the lever 3 correspondingly so the rollers 6 fit to extend into the recesses 5. Both the lever 3 and the frame 1 comprise a support face as earlier mentioned. Both of these support faces comprise planar portions which are parallel with the plane of rotation of the lever 3. Thereby, compact structure is achieved. The brake also preferably comprises a stop member 16 placed on the path of the lever 3 to limit the rotation thereof. It is positioned preferably such that the lever can not rotate so much that the roller 6 meets the planar portion of the lever 3 which is parallel with the plane of rotation of the lever. Thus, the lever cannot be rotated so much that it can lock to released position II.

Figure 8:
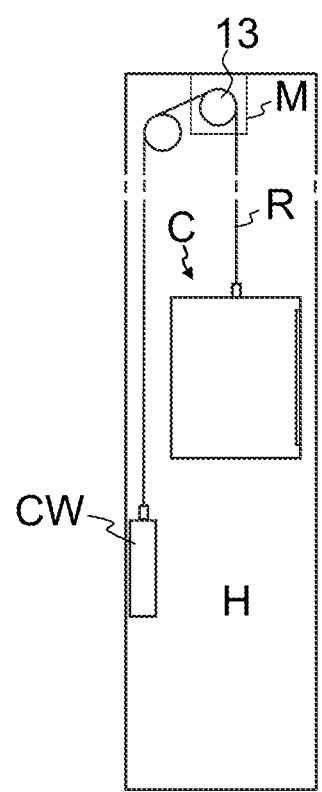
FIG. 8 illustrates an elevator according a preferred embodiment.

FIG. 8 illustrates a preferred embodiment of an elevator. The elevator comprises an elevator car C and a brake for stopping the elevator car C and/or holding the elevator car C in stopped state. The brake is as defined in context of FIGS. 1-7. The brake is arranged to affect via a braking member 2 a movable component 13 of the elevator that is connection with the elevator car C in force transmitting manner. In particular, the brake is arranged to affect via a braking member 2 the drive sheave 13 of the elevator which drive sheave 13 is in connection with the elevator car C in force transmitting manner via a hoisting roping R. The elevator preferably travels in a hoistway H. The elevator comprises a hoisting machine M comprising said drive sheave 13 and a brake for braking the drive sheave 13 as illustrated in FIG. 5. Particularly, the component the movement of which is being braked is in the preferred embodiment an extension of the drive sheave 13 of the elevator. The hoisting machine M preferably drives the elevator car C under control of an elevator control system (not shown). The elevator control system preferably also comprises a brake control for controlling the means 8.

The releasing means, in particular the lever 3, is manually operable. For this purpose, the brake comprises a handle which is functionally connected to the lever such that actuation of the handle rotates the lever 3. This moves the lever axially which moves the braking member towards released position as above explained. The handle is not shown in the Figures but it is connected to the lever mechanically, which can be implemented in various ways. Preferably, the handle is connected to the lever with a wire so that the wire transmits actuation force from the handle to the lever 3.

In the illustrated preferred embodiment the cylindrical roller(s) 6 is/are mounted on brake frame 1 between the brake frame 1 and the lever 3, and the lever 3 comprises the recess(es) 5. However, it should be noted that these could alternatively be placed vice versa, i.e. the cylindrical roller(s) 6 could be mounted on the lever 3 between the brake frame 1 and the lever 3, and the frame 1 could comprise the recess(es) 5.

It is to be understood that the above description and the accompanying Figures are only intended to illustrate the present invention. It will be apparent to a person skilled in the art that the inventive concept can be implemented in various ways. The invention and its embodiments are not limited to the examples described above but may vary within the scope of the claims.

The invention claimed is:

1. A braking system, comprising:
    a drive sheave, the drive sheave connected to an elevator car via a hoisting rope, the drive sheave configured to control movement of the elevator car based on controlling movement of the hoisting rope,
    a frame,
    a braking member on the frame movably between a braking position and a released position, the braking member configured to engage the drive sheave to cause braking of the elevator car via the hoisting rope based on the braking member being in the braking position, and
    a rotatable lever on the frame, the rotatable lever being functionally connected to the braking member such that movement of the rotatable lever axially away from the frame moves the braking member towards the released position such that the braking member releases engagement with the drive sheave to release braking of the elevator car via the hoisting rope,
    wherein a plurality of cylindrical rollers are on one of the frame and the rotatable lever, to be positioned between the frame and the rotatable lever,
    the frame includes a recess configured to receive said plurality of cylindrical rollers, and in rotation, the rotatable lever is configured to cause said plurality of cylindrical rollers to roll outwardly from the recess along an edge portion of the recess forcing the rotatable lever to move axially away from the frame, so as to cause the braking member to move towards the released position such that the braking member releases engagement with the drive sheave to release braking of the elevator car via the hoisting rope, and
    the plurality of cylindrical rollers are positioned 90 degrees with respect to each other.

2. The braking system according to claim 1, wherein each of said plurality of cylindrical rollers has a rotational axis aligned radially with a rotational axis of the rotatable lever.

3. The braking system according to claim 1, further comprising an urging device configured to urge the braking member towards the braking position.

4. The braking system according to claim 3, wherein movement of the rotatable lever axially away from the frame moves the braking member towards the released position working against the urging device.

5. The braking system according to claim 1, wherein each of said plurality of cylindrical rollers is elongated in its axial direction.

6. The braking system according to claim 1, wherein the recess is a groove aligned radially to a rotational axis of the rotatable lever.

7. The braking system according to claim 1, wherein the edge portion along which the plurality of cylindrical rollers roll thereof includes a surface portion which is at an acute angle relative to a plane or rotation of the rotatable lever.

8. The braking system according to claim 1, wherein the edge portion along which the plurality of cylindrical rollers roll thereof includes a planar surface portion which is at an angle relative to a plane or rotation of the rotatable lever.

9. The braking system according to claim 1, wherein said plurality of cylindrical rollers are not mounted in a bearing housing formed in the frame.

10. The braking system according to claim 1, wherein each of said plurality of cylindrical rollers has a linear contact area with the recess.

11. The braking system according to claim 1, wherein the rotatable lever includes a plurality of recesses configured to receive the plurality of cylindrical rollers, and in rotation, the rotatable lever is configured to cause each cylindrical roller to roll outwardly from a corresponding recess of the plurality of recesses along an edge portion of the plurality of recesses forcing the rotatable lever to move axially away from the frame so as to cause the braking member to move towards the released position.

12. The braking system according to claim 1, wherein the rotatable lever is configured to mechanically connect to the braking member.

13. The braking system according to claim 1, further comprising a releasing device configured to release the brake, which is controllable by an electronic control system.

14. An elevator comprising the elevator car and the braking system according to claim 1 for stopping the elevator car or holding the elevator car in a stopped state, the brake being arranged to affect via the braking member a movable component of the elevator that is connected to the elevator car in a force transmitting manner.

* * * * *